US 6,584,911 B2

(12) United States Patent
Bergerson et al.

(10) Patent No.: US 6,584,911 B2
(45) Date of Patent: Jul. 1, 2003

(54) INITIATORS FOR AIR BAG INFLATORS

(75) Inventors: Lee D. Bergerson, Fountain Valley, CA (US); Ivan L. Stonich, Hermosa Beach, CA (US); Christopher C. Shih, Torrance, CA (US); Timothy A. Swann, Mesa, AZ (US); Brian R. Pitstick, Mesa, AZ (US); Bryan W. Shirk, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/843,546

(22) Filed: Apr. 26, 2001

(65) Prior Publication Data

US 2002/0158455 A1 Oct. 31, 2002

(51) Int. Cl.$^7$ ............................. C06D 5/00; B60R 21/26
(52) U.S. Cl. ...................................... 102/530; 280/733
(58) Field of Search ............................. 102/530, 202.5, 102/202.9, 202.14; 280/733, 735, 728.2

(56) References Cited

U.S. PATENT DOCUMENTS

| | | | |
|---|---|---|---|
| 2,911,504 A | | 11/1959 | Cohn |
| 3,503,814 A | | 3/1970 | Helms, Jr. |
| 3,724,870 A | | 4/1973 | Kurokawa et al. |
| 5,167,426 A | * | 12/1992 | Mihm et al. ............... 280/735 |
| 5,366,239 A | * | 11/1994 | Headley ................... 280/728.2 |
| 5,621,183 A | * | 4/1997 | Bailey ...................... 102/202.14 |
| 5,880,921 A | | 3/1999 | Tham et al. |
| 5,892,433 A | * | 4/1999 | Fulda ....................... 180/282 |
| 5,977,653 A | * | 11/1999 | Schmid et al. ............ 180/282 |
| 5,984,350 A | * | 11/1999 | Hagan et al. ............. 280/733 |
| 6,234,520 B1 | * | 5/2001 | Breed et al. .............. 180/282 |
| 6,250,672 B1 | * | 6/2001 | Ryan et al. ................ 180/268 |
| 6,305,708 B2 | * | 10/2001 | Davis et al. .............. 280/735 |
| 6,431,594 B1 | * | 8/2002 | Swann et al. ............. 280/735 |

FOREIGN PATENT DOCUMENTS

EP 0903487 11/1999

OTHER PUBLICATIONS

U.S. patent application Ser. No. 09/755,704, Filed Jan. 5, 2001; entitled Air Bag Inflators.
U.S. patent application Ser. No. 09/756,409, Filed Jan. 8, 2001; entitled Seat Belt Webbing Pretensioner Using MEMS Devices.
U.S. patent application Ser. No. 09/818,129, Filed Mar. 27, 2001; entitled Air Bag Inflators.
U.S. patent application Ser. No. 09/933,926, filed Aug. 21, 2001 entitled "Inflatable Seat Belt Using MEMS Devices".
Article, D. Lewis, et al., entitled "Digital Micropulsion", Sensors and Actuators A; Physical, vol. 80, No. 2, Elsevier, Mar., 2000, p. 143,154.

* cited by examiner

Primary Examiner—Charles T. Jordan
Assistant Examiner—Bret Hayes
(74) Attorney, Agent, or Firm—Tarolli, Sundheim, Covell & Tumino L.L.P.

(57) ABSTRACT

An initiator (40) for actuating an inflation fluid source (34) for an inflatable vehicle occupant protection device (36) comprises a plurality of electrically energizable microelectromechanical system (MEMS) devices (120–126). In one embodiment, the MEMS devices (120–126) are associated in a one to one relationship with chambers (75–78) containing ignitable material (130). Each one of the MEMS devices (120–126), when energized, generates combustion products, including heat, for igniting the associated ignitable material (130). At least one terminal pin (44–46) is electrically connected with the plurality of MEMS devices (120–126) for receiving an electric signal for energizing at least one of the MEMS devices.

26 Claims, 5 Drawing Sheets

INITIATORS FOR AIR BAG INFLATORS

BACKGROUND OF THE INVENTION

1. Technical Field

The present invention relates to a vehicle occupant protection apparatus and, in particular, to an initiator for an inflator for an air bag or other inflatable occupant protection device.

2. Description of the Prior Art

European Patent Application EP 0 903 487 A2 describes an integrated pulsed propulsion system for a microsatellite and, in particular, a micro thruster for a microsatellite. The microthruster is formed with a chamber closed by a diaphragm, which acts as a blow-out disk. A fluid, such as an inert gas, is disposed within the chamber. Heating of the gas causes the gas pressure to increase until the diaphragm ruptures, which, in turn, causes the gas to flow out of the chamber. The flowing gas acts as a propellant, and provides a small unit of force. The microthruster is adapted to be formed by known batch processing methods with 104 to 106 microthrusters per wafer. The unit of force can be scaled by varying the number of microthrusters used for an application, the geometry of the chamber, and the type of fluid used within the chamber.

The microthruster described in EP 0 903 487 A2 is described elsewhere in the literature as consisting of a 3-layer sandwich. The top layer contains an array of thin diaphragms (0.5 micron thick silicon nitride, 190 or 290 or 390 microns square). The middle layer contains an array of through-holes (Schott FOTURAN® photosensitive glass, 1.5 mm thick, 300, 500, or 700 micron diameter holes), which are loaded with propellant. The bottom layer contains a matching array of polysilicon micro-resistors. The bottom two layers are bonded together, propellant is added to the middle layer, and then the top layer is bonded to complete the assembly. With different sizes of plenum holes, diaphragms, and resistors, many different configurations can be assembled.

This type of microthruster is one type of device known in the art as a "microelectromechanical system device", or "MEMS device". This type of device is known for use in a variety of applications. For example, U.S. Pat. No. 5,880,921 discloses a monolithically integrated switched capacitor bank using MEMS technology.

SUMMARY OF THE INVENTION

The present invention is an initiator for actuating an inflation fluid source for an inflatable vehicle occupant protection device. The initiator comprises a plurality of electrically energizable microelectromechanical system (MEMS) devices.

In one embodiment, the MEMS devices are associated in a one to one relationship with chambers containing ignitable material. Each one of the MEMS devices, when energized, generates combustion products, including heat, for igniting the associated ignitable material. At least one terminal pin is electrically connected with the plurality of MEMS devices for receiving an electric signal for energizing at least one of the MEMS devices.

In another embodiment, the inflation fluid source comprises a solid body of ignitable material in a housing for, when ignited, generating inflation fluid for inflating the protection device. The MEMS devices are at spaced locations adjacent the body of ignitable material and, when energized, fracture the body ignitable material at the spaced locations.

In another embodiment, the MEMS devices are supported at predetermined locations adjacent a burst disk and are selectively energizable to make an opening of a selected configuration in the burst disk.

In another embodiment, the inflation fluid source is located in a chamber. An actuation module in the chamber includes a plurality of individually energizable microelectromechanical system (MEMS) devices. The actuation module also includes a receiver for receiving a control signal from outside the chamber for energizing at least one of the MEMS devices to actuate the inflation fluid source. The inflator is free of wires extending into the chamber.

In another embodiment, the initiator comprises a first plurality of MEMS devices for opening a burst disk and a second plurality of MEMS devices for igniting an ignitable material.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS OF THE INVENTION

Figure 1:
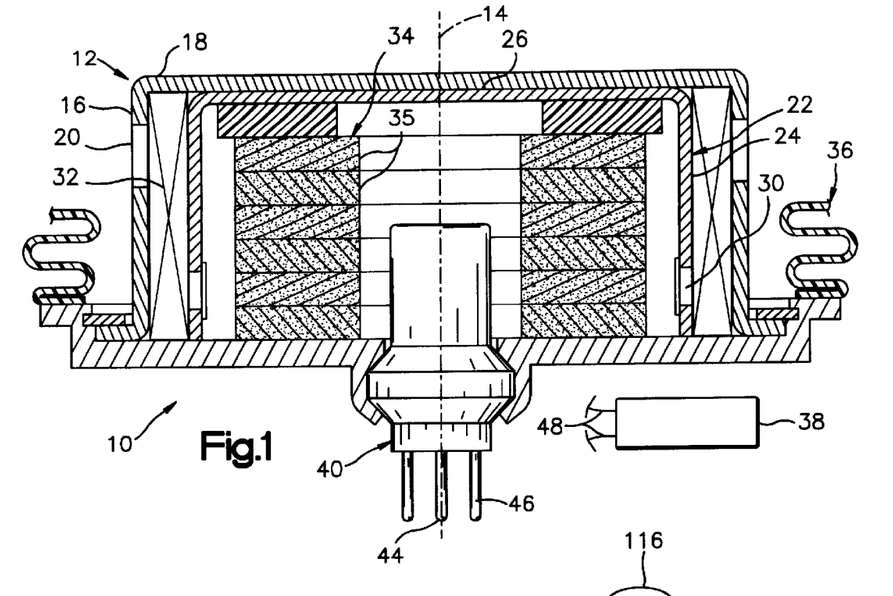
FIG. 1 is a sectional view of an inflator including an initiator in accordance with a first embodiment of the present invention.

The present invention relates to a vehicle occupant protection apparatus. In particular, the invention relates to an initiator for an inflator for an air bag or other inflatable occupant protection device. As representative of the present invention, FIG. 1 illustrates an initiator 40 that forms part of an inflator 10. The inflator 10 is of the type shown in U.S. Pat. No. 5,366,239 and has a cylindrical housing 12, which is centered on an axis 14. The housing 12 has a cylindrical outer side wall 16 and a circular end wall 18. The outer side wall 16 includes a plurality of gas outlet openings 20 in an array extending circumferentially around the outer side wall.

The housing 12 further includes a combustion cup 22, which is located radially inward of the outer side wall 16. The combustion cup 22 has a cylindrical side wall 24 and a circular upper end wall 26. The upper end wall 26 of the combustion cup 22 is fixed, such as by welding, to the end wall 18 of the housing 12. The side wall 24 of the combustion cup 22 has a plurality of gas flow openings 30 in an array extending circumferentially around the side wall.

The housing 12 contains a filter assembly 32 located in the annular space between the combustion cup 22 and the outer side wall 16. The housing 12 also contains a known, solid ignitable gas generating material 34 within the combustion cup 22. The gas generating material 34, as illustrated, is in the form of a plurality of stacked discs 35. The gas generating material 34 could, however, have any other suitable configuration known in the art.

The inflator 10 is associated with an inflatable vehicle occupant protection device in the form of an air bag shown partially at 36. The air bag 36 extends around the gas outlet openings 20. Other vehicle occupant protection devices that can be used in accordance with the invention include, for example, inflatable seat belts, inflatable knee bolsters, inflatable head liners, inflatable side curtains, knee bolsters actuated by air bags, and seat belt pretensioners.

The initiator 40 is disposed adjacent the gas generating material 34. Vehicle electric circuitry in the form of a controller indicated schematically at 38 is operative to actuate the initiator 40 in the event inflation of the air bag 36 is desired to help protect a vehicle occupant. The controller 38 preferably includes one or more microprocessors for controlling operation of the inflator 10. The controller 38 may, for example, be a plurality of discrete components and/or a combination of discrete components and integrated circuits. In one example, the controller 38 is a microcomputer that receives sensory input from one or more sources, such as occupant condition sensors and vehicle condition sensors, and, using the sensory input, makes determinations for control of the inflator 10.

Actuation of the initiator 40, as described below, causes the gas generating material 34 to be ignited. When the gas generating material 34 is ignited, it rapidly produces a large volume of inflation fluid in the form of gas. The pressure inside the combustion cup 22 rises rapidly. The inflation fluid flows through the gas flow openings 30 and into the filter assembly 32. The inflation fluid then flows out of the inflator 10, through the gas outlet openings 20, to inflate the air bag 36.

The initiator 40 includes a base 42 (FIG. 2) made from an electrically insulating material, such as molded plastic. The base 42 is centered on the axis 14. A plurality of terminal pins extend through the base 42, including a central pin 44 and four outer pins 46 disposed radially outward of the central pin 44 and the axis 14. The terminal pins 44 and 46 have end portions that project from the base 42 for connection with lead wires 48 and, thereby, with the controller 38.

Figure 2:
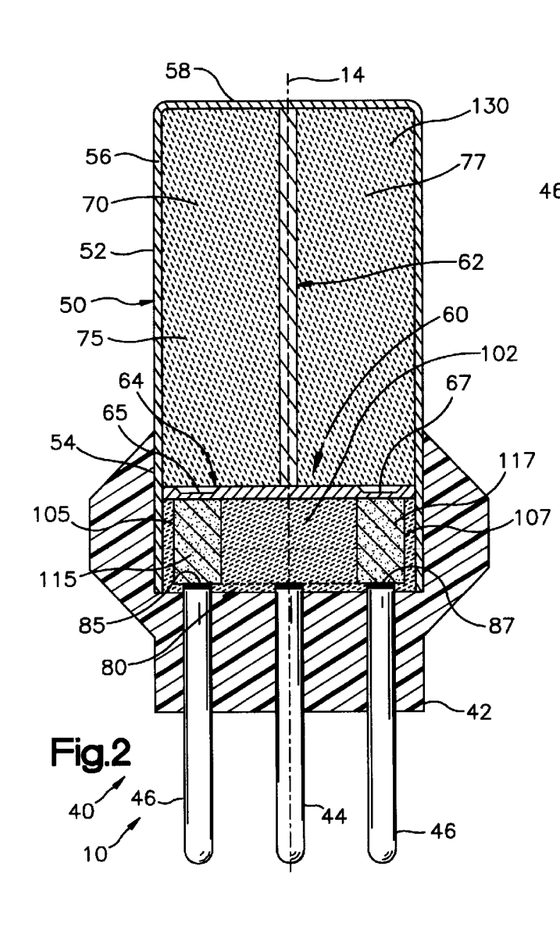
FIG. 2 is a sectional view of the initiator of the inflator of FIG. 1.
Figure 3:
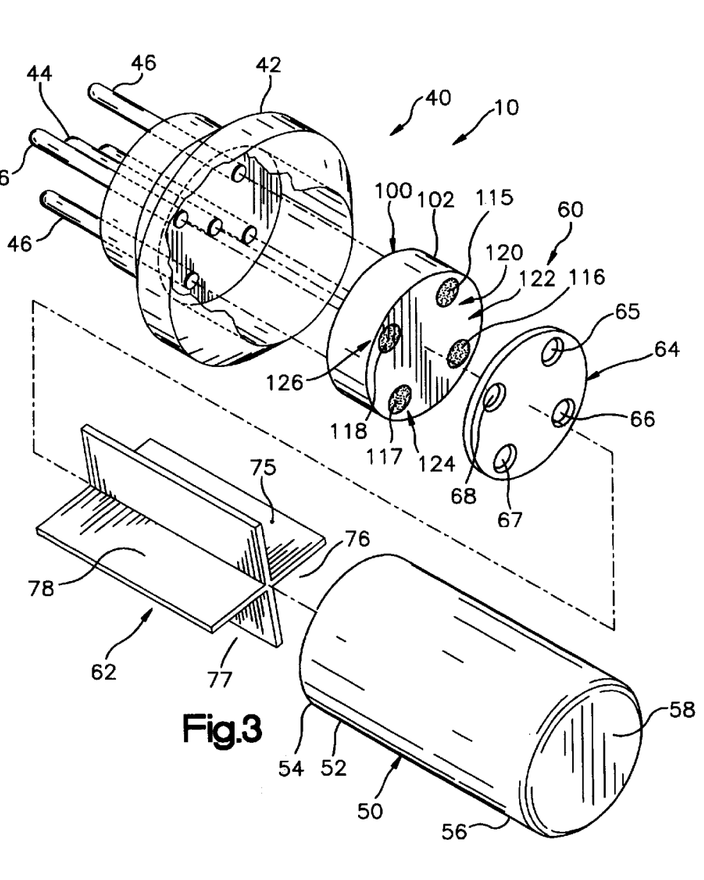
FIG. 3 is an exploded perspective view of the initiator of FIG. 2.

The initiator includes a cover, or can, 50 mounted on the base 42. The can 50 has a cylindrical configuration including a cylindrical, axially extending side wall 52. The side wall 52 has an inner end portion 54 secured in the base 42. An outer end portion 56 of the side wall 52 is capped by a circular, radially extending end wall 58 of the can.

The initiator includes a microelectromechanical system (MEMS) array 60. The MEMS array 60, and a divider 62, are located in the can 50. The MEMS array 60, described below in detail, includes a closure wall 64 having four rupturable portions 65, 66, 67 and 68.

The can 50 defines a chamber 70 in the initiator 40 between the end wall 58 and the MEMS array 60. The divider 62 is located in the chamber 70. The divider 62 may be made from metal and has a cruciform cross-sectional configuration. The divider 62 extends for the length of the chamber 70 between the MEMS array 60 and the end wall 58 of the can. The divider 62 may, alternatively, be formed as one piece with the can 50.

The divider 62 divides the chamber 70 into four charge chambers 75, 76, 77 and 78. Each one of the four charge chambers 75–78 is closed at its outer end by the end wall 58 of the can 50. Each one of the four charge chambers 75–78 is closed at its inner end by a portion of the closure wall 64 of the MEMS array 60 that includes a respective one of the rupturable portions 65–68 of the closure wall.

The initiator 40 also includes, in each one of the charge chambers 75–78, contents that are ignitable to produce hot combustion products. In the illustrated embodiment, each one of the charge chambers 75–78 contains a solid propellant material 130 (FIG. 2), or pyrotechnic material, which is actuatable, or ignitable, upon the application of heat.

Figure 4:
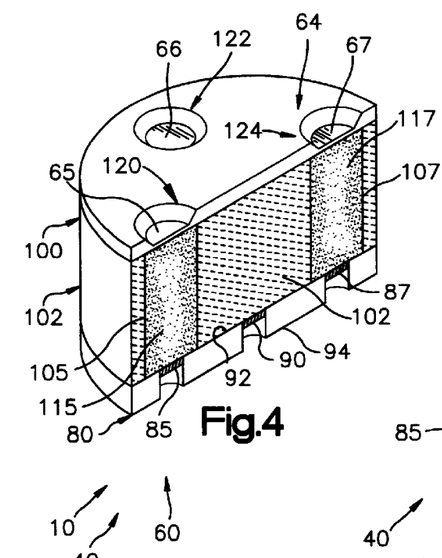
FIG. 4 is a cutaway perspective view of one MEMS device that forms part of the initiator of FIG. 2.
Figure 5:
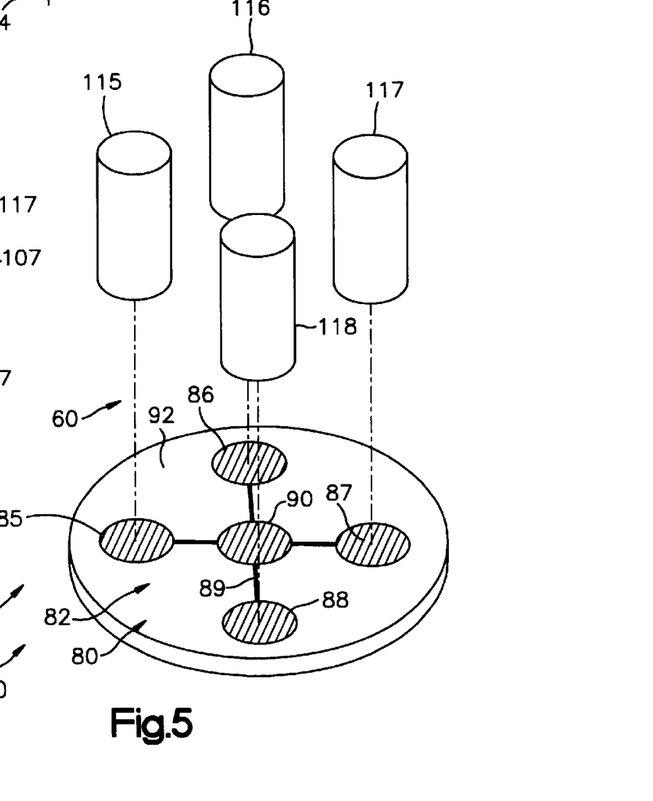
FIG. 5 is a schematic exploded view of portions of the MEMS device of FIG. 4.

The MEMS array 60 is shown in more detail in FIGS. 4 and 5. The MEMS array 60, as illustrated, includes four individually energizable MEMS devices and has a cylindrical configuration. It should be understood that a MEMS array 60 for an initiator in accordance with the present invention could have a different number of MEMS devices and could have a different configuration.

The MEMS array 60 is a multi-layered structure, which may be manufactured in a manner similar to that described in European Patent Application EP 0 903 487 A2, and in the article D. Lewis, et al., "Digital Micropropulsion", Sensors and Actuators A: Physical, Vol. 80, No. 2, Elsevier, March, 2000, p. 143–154.

The MEMS array 60 includes a base 80. The base 80 may be made using standard complementary metal oxide semiconductor (CMOS) processes. The base 80 may be made from silicon or other suitable material, such as polyimide or ceramic.

The base 80 has a cylindrical configuration and includes electric circuitry 82. The electric circuitry 82 includes a plurality of individually energizable electric heating elements. In the illustrated embodiment, the electric circuitry 82 includes four individually energizable electric heating elements 85, 86, 87 and 88, spaced apart in a circular array centered on the axis 14. The electric circuitry 82 on the base 80 may also include address and control electronics.

The heating elements 85–88 are connected by leads 89 with a central pad 90. The heating elements 85–88 are exposed along both the upper surface 92 and the lower surface 94 of the base 80. The central pad 90 is also exposed along the upper surface 92 and the lower surface 94 of the base 80.

The heating elements 85–88 may be polysilicon resistors or other micro-resistors, such as nickel, niobium, and niobium nitride. The MEMS heating elements 85–88 may, alternatively, be made as a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, Mount Vernon, N.Y., Internet address www.sigmundcohn.com, under the brand name PYROFUZE®. When the two metallic elements of the reactive bridge are brought to the initiating temperature by flow of electric current, they alloy rapidly, resulting in instant deflagration without support of oxygen. A reactive bridge generates and disperses sufficient heat that it need only be close to (and not in intimate contact with) the material that it is to ignite (such as solid propellant).

The MEMS array 60 also includes a middle layer 100. The middle layer 100 includes a propellant block 102. The propellant block 102 defines a series of cylindrical plenums or propellant chambers. In the illustrated embodiment, the propellant block 102 defines four cylindrical propellant chambers, only two of which are shown at 105 and 107. The four propellant chambers (only two of which are shown at 105 and 107) are spaced apart in the propellant block 102 in the same circular array as the four heating elements 85–88 on the base 80. The heating elements 85–88 are associated in a one-to-one relationship with the propellant chambers for, when energized, heating the contents of the propellant chambers.

One suitable material for the propellant block 102 is hard anodized aluminum. Another suitable material for the propellant block 102 is FOTURAN brand photosensitive glass. FOTURAN is a registered trademark of Schott Glaswerke of Mainz, Germany for its products made of glass or glass ceramic materials. This material can be used to make very fine structures with tight tolerances and high aspect ratios (hole depth to hole width).

The middle layer 100 of the MEMS array 60 also includes, in each one of the propellant chambers, contents that are ignitable to produce combustion products, including heat and a shock wave. In the illustrated embodiment, the contents of the four propellant chambers, two of which are shown at 105 and 107, are bodies 115, 116, 117 and 118 of a solid propellant material, or pyrotechnic material, which is actuatable, or ignitable, upon the application of heat. Each propellant body 115–118 has a cylindrical configuration and fills a respective one of the propellant chambers.

One suitable material for the propellant bodies 115–118 is zirconium potassium perchlorate, which is commonly used in igniters for air bag inflators. Another suitable material is potassium dinitrobenzofuroxan (KDNBF).

The MEMS array 60 also includes the closure wall or outer layer 64. The outer layer 64 includes the four individually rupturable portions or diaphragms 65–68. The diaphragms 65–68 are thin-walled portions of the outer layer 64. The four diaphragms 65–68 are spaced apart in the outer layer 64 in the same circular array as the four propellant bodies 115–118 and the four heating elements 85–88.

The outer layer 64 may be made from aluminum tape or KAPTON brand tape, which is a polymer tape manufactured by DuPont. The diaphragms 65–68 may be thin silicon nitride remaining after an anisotropic wet etch through a silicon wafer. Other suitable materials include ceramics, such as silicon carbide, and metals. The three layers 80, 10, and 64 of the MEMS device 30 may be bonded together with a high performance adhesive tape or an aerospace grade RTV adhesive.

The individual diaphragms 65–68 of the outer layer 64 are associated in a one-to-one relationship with the individual propellant chambers, only 105 and 107 shown. Each diaphragm 65–68 closes a respective propellant chamber. Each one of the diaphragms 65–68 is rupturable in response to an increase in pressure in its associated propellant chamber to enable flow of combustion products out of the chamber.

The MEMS array 60 as thus formed includes four individually energizable MEMS devices 120, 122, 124 and 126. Each one of the four MEMS devices 120–126 includes a heating element, a propellant chamber, ignitable propellant in the chamber, and a rupturable diaphragm closing the chamber.

The MEMS array 60 is mounted in the lower end portion 54 of the can 50 as shown in FIG. 2. The four outer terminal pins 46 of the initiator 40 engage the four heating elements 85–88, respectively. The central terminal pin 44 engages the central pad 90. As a result, the four MEMS devices 120–126 are electrically connected with the vehicle electric circuitry controller 38. Each one of the MEMS devices 120–126 is in a circuit between its associated outer terminal pin 46 and the central terminal pin 44.

In the event of a vehicle collision or other event for which protection of the vehicle occupant is desired, the controller 38 sends an actuation signal over the lead wires 48 to the initiator 40 of the inflator 10. The actuation signal enters the MEMS array 60 of the initiator 40 through one or more of the terminal pins 44 or 46. The controller 38 is operable to provide an actuation signal for energizing any selected one or more of the MEMS devices 120–126 within the MEMS array 60, at a selected time. Thus, the initiator 14 is effectively "digital" in construction and operation, that is, comprising a plurality of discrete, individually actuatable ignition sources.

A circuit is completed between the central pad 90 and one or more of the four heating elements 85–88. When an individual heating element 85–88 of one of the MEMS devices 120–126 is energized, the heating element generates heat, which is transmitted into the associated propellant body 115–118. The propellant body 115–118 ignites and generates combustion products under pressure in its propellant chamber. The increased pressure in the propellant chamber causes the associated diaphragm 65–68 of the top layer 64 to rupture.

The combustion products of the propellant bodies 115–118 ignite the charge 130 in the can 50. The combustion products of the charge 130 rupture the end wall 58 and side wall 52 of the can 50, and ignite the disks 35 of gas generating material 34. Inflation fluid generated by the gas generating material 34 is directed into the air bag 36 to inflate the air bag.

The fluid output of the inflator 10 is dependent on, and varies with, the number of the heating elements 85–88 that are energized, the number of the propellant bodies 115–118 that are ignited, and the time at which each individual propellant body is ignited. The output is also dependent on the volume of each propellant chamber, only 105 and 107 shown, and the type and amount of propellant disposed in the propellant chambers.

In the microthruster application described in European Patent Application EP 0 903 487 A2, each plenum or propellant chamber is about 1.5 mm tall (axial length) and up to about 0.7 mm in diameter. The depth of each propellant chamber in one of the MEMS devices of the present invention can be as much as 10 mm or more, and the diameter as much as 2 mm or more. A MEMS array for use in the initiator 40, having from three to fifteen individual MEMS devices or more, may be from one millimeter in diameter to 10 millimeters in diameter or more.

The vehicle electric circuitry 38 can control the rate of fluid output of the inflator 10 over a period of time, by selectively causing the ignition of any one or more of the plurality of propellants bodies 115–118 over a period of time. The controller 38 is operative, in a known manner, to actuate the propellant bodies 115–118 all at once or in any controlled sequence depending on information about the vehicle event and occupant received from appropriate sensors forming part of the vehicle electric circuitry.

In another variation, one of the MEMS devices 120–126 may contain a first quantity of material that is ignitable to generate combustion products of a first magnitude, while a second MEMS device may contain a second quantity of material, different from the first quantity, that is ignitable to generate combustion products of a second magnitude different from the first magnitude. In addition, one of the charge chambers 75–78 of the initiator 40 may contain a first type or quantity of material 130 that is ignitable to generate combustion products of a first magnitude, while another one of the charge chambers may contain a second type or quantity of ignitable material, different from the first type or quantity of ignitable material, that is ignitable to generate combustion products of a second magnitude different from the first magnitude. Thus, energizing one or the other of the individual MEMS devices 120–126 can produce combustion products, from the initiator, of varying magnitudes.

Figure 6:
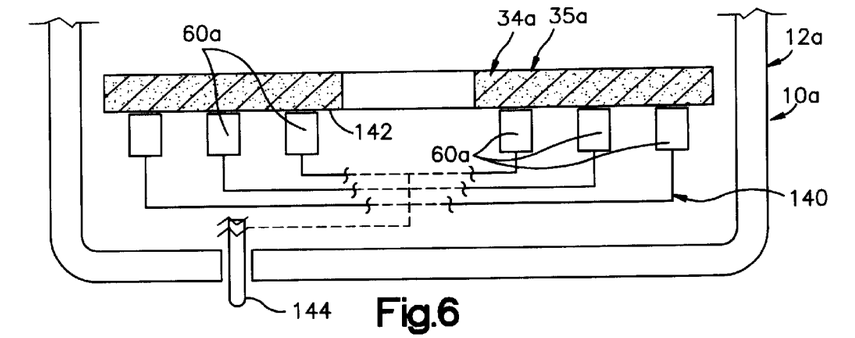
FIG. 6 is a schematic view in section of portions of an inflator including an initiator in accordance with a second embodiment of the present invention.

FIG. 6 illustrates a portion of an inflator 10*a* constructed in accordance with a second embodiment of the present invention. The inflator is generally of the type shown in FIG. 1 including a housing 12*a* containing one or more bodies of solid, ignitable gas generating material 34*a*, each in the form of a disk 35*a*.

The inflator 10*a* includes an initiator 140 for igniting the disk or disks 35*a*. The initiator 140 comprises a plurality of MEMS devices. In the illustrated embodiment, the initiator 140 comprises six arrays 60*a* of MEMS devices. The MEMS devices may be of the type shown and described above with reference to FIGS. 1–5. The MEMS arrays 60*a* are located at spaced locations along a surface 142 of an adjacent disk 35*a*. Each one of the MEMS arrays 60*a* may comprise one or a plurality of MEMS devices as shown with respect to the MEMS array 60 illustrated in FIGS. 1–5.

The MEMS devices included in the arrays 60*a* are individually actuatable to generate combustion products, including heat and a shock wave. The inflator 10*a* includes at least one terminal pin 144 electrically connected with the plurality of MEMS devices in the MEMS arrays 60*a*, for receiving an electric actuating signal for energizing the plurality of MEMS devices. The inflator 10 may include circuitry for determining which ones of the MEMS devices in the MEMS arrays 60*a* to energize in response to the actuating signal.

Upon actuation of the inflator 10, the selected MEMS devices of the MEMS arrays 60*a* are energized and direct combustion products against the adjacent disk 35*a* at spaced locations. The disk 35*a* fractures at the spaced locations. This fracturing of the disk 35*a* can help to promote ignition of the ignitable material of the disk, and can help to control burning of the ignitable material.

The MEMS devices or the MEMS arrays 60*a* can be located at various other places on the disk 35*a*. For example, if both sides of the disk 35*a* are accessible, then the MEMS arrays 60*a* can be located on both sides.

Figure 7:
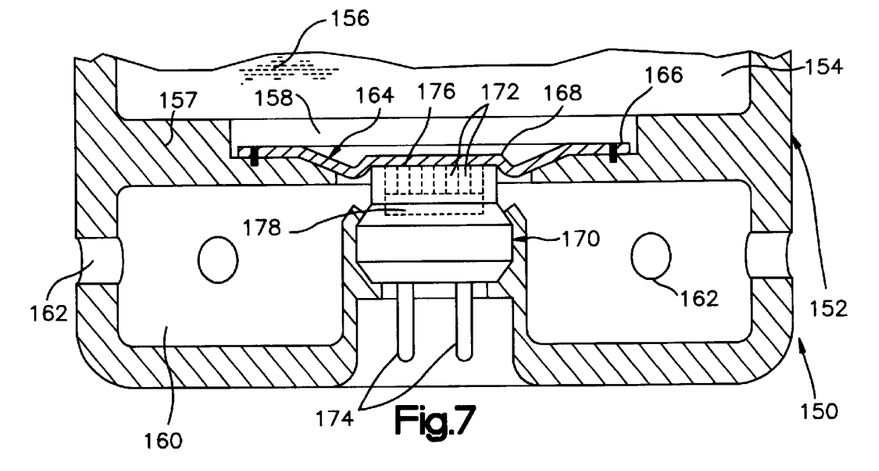
FIG. 7 is a sectional view of portions of an inflator including an initiator in accordance with a third embodiment of the present invention.
Figures 8, 9:
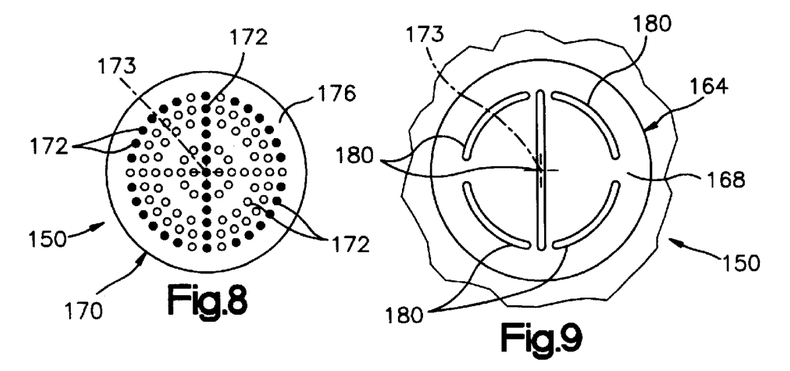
FIG. 8 is an end view of the initiator of FIG. 7.
FIG. 9 is a plan view of a burst disk that forms part of the inflator of FIG. 7, showing rupture lines in the burst disk.

FIGS. 7–9 illustrate a portion of an inflator 150 constructed in accordance with a third embodiment of the present invention. The inflator 150 includes a housing shown partially at 152. The housing 152 defines a gas storage chamber 154. Inflation fluid under pressure 156, such as an inert gas, is stored in the chamber.

The housing 152 has an inner wall 157 that defines an opening 158 into the gas storage chamber 154. The opening 158 extends between the chamber 154 and a manifold 160. The manifold 160 has a plurality of inflation fluid outlets 162.

The inflator 150 includes a burst disk 164 that extends across the opening 158 in the housing 152. The burst disk 164 has a circular configuration including an outer peripheral portion 166 welded to the housing 152 and a central portion 168 that extends across the opening 158.

The inflator 150 includes an initiator 170, located in the manifold. The initiator 170 includes a plurality of individually energizable MEMS devices shown schematically at 172. The plurality of MEMS devices 172 are electrically connected with terminal pins 174 for receiving an electric signal for energizing the MEMS devices.

The MEMS devices 172 are supported at predetermined locations adjacent the burst disk 164. Specifically, the MEMS devices 172 are arranged in a pattern on an end surface 176 of the initiator 170 that is presented toward the central portion 168 of the burst disk 164. In the illustrated embodiment, the MEMS devices 172 are arranged in a pattern including at least four circles and a cross, all centered on an axis 173.

The MEMS devices 172 are individually energizable to make an opening of a predetermined configuration in the burst disk 164. The initiator 170 includes control circuitry indicated schematically at 178 for receiving the electric signal from the terminal pins 174 and for, in response, energizing selected ones of the MEMS devices 172. The electric signal may be provided by a controller, such as the controller 38 (FIG. 1). The controller may be operative to receive input from one or more sensors to determine the desired configuration of the opening in the burst disk 164 and to energize appropriate ones of the MEMS devices 172 as a result.

Upon actuation of the inflator 150, the selected ones of the MEMS devices 172 are energized and direct combustion products against the central portion 168 of the burst disk 164 at spaced locations. The burst disk 164 ruptures at the spaced locations. This rupturing of the burst disk 164 enables inflation fluid to flow out of the inflator 150 from the gas storage chamber 154.

The burst disk 164 is ruptured in a particular manner depending on which ones of the MEMS devices 172 are energized. For example, if the MEMS devices 172 shown in FIG. 8 with the solid circles are energized, rupture lines 180 can be formed in the burst disk 164 in the manner shown in FIG. 9.

In this manner, the configuration of the opening in the burst disk 164 can be controlled, or tailored, by controlled energizing of the MEMS devices 172. In addition, the opening of the burst disk 164 can be effected over an extended period of time by energizing some of the MEMS devices 172 at one time, then energizing others of the MEMS devices at a second time, later than the first time.

Figure 10:
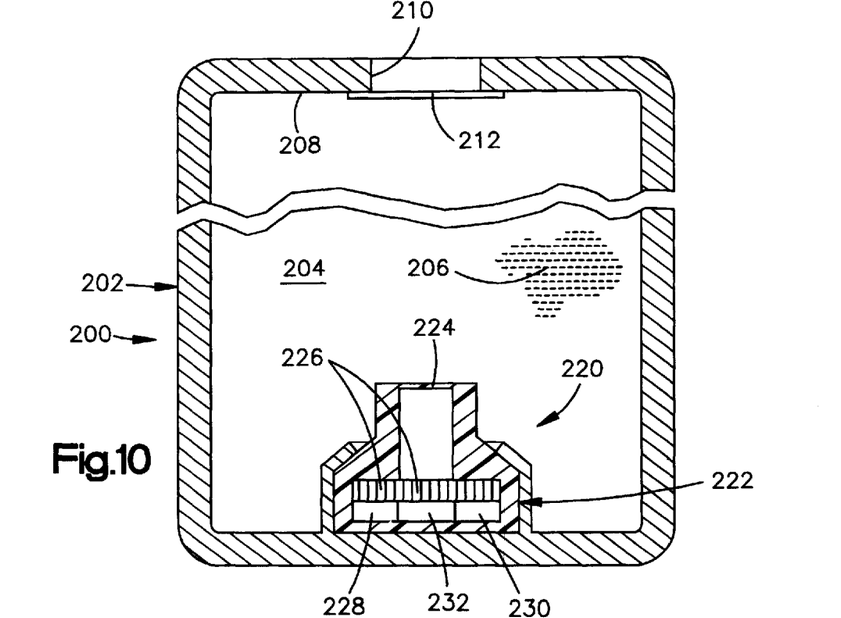
FIG. 10 is a sectional view of an inflator including an initiator in accordance with a fourth embodiment of the present invention.

FIG. 10 illustrates a portion of an inflator 200 constructed in accordance with a fourth embodiment of the present invention. The inflator 200 includes a housing 202 defining a gas storage chamber 204. An actuatable inflation fluid source 206 is contained in the chamber 204. The inflation fluid source 206 may comprise, for example, an ignitable mixture of gases that, when ignited, results in inflation fluid under pressure.

The housing 202 has an end wall 208 that defines an opening 210 into the chamber 204. The inflator 200 includes a burst disk 212 that extends across the opening 210 in the housing 202.

The inflator 200 includes an actuation module indicated schematically at 220. The actuation module 220 includes a base 222 that encloses the other parts of the actuation module. The base 222 has a rupturable portion 224 that separates the other parts of the actuation module from the gas storage chamber 204.

The actuation module 220 includes a plurality of MEMS devices, indicated schematically at 226. The MEMS devices 226 may be of the type shown and described above with reference to FIGS. 1–5. The MEMS devices 226 are individually energizable to generate combustion products, including heat and a shock wave.

The actuation module 220 also includes a power storage device 228 for storing electric power for energizing the MEMS devices 226. The power storage device 228 may be a capacitor coupled to a piezoelectric generator.

The actuation module 220 also includes a receiver 230 for receiving a wireless control signal transmitted into the chamber 204 from outside the chamber (i.e., from outside the inflator 200).

The actuation module 220 further includes a controller 232. The controller 232 is operable to receive the output of the receiver 230 and, in response, to energize selected ones or all of the plurality of MEMS devices 226.

When it is desired to actuate the inflator 200, vehicle electric circuitry (not shown) including a transmitter sends a control signal to the receiver 230. The controller 230, in response, actuates one or more of the MEMS devices 226. The actuated MEMS devices 226 direct combustion products into the chamber 204 and actuate the inflation fluid source 206. The burst disk 212 ruptures due to the increased fluid pressure in the chamber 204, enabling inflation fluid to flow out of the inflator 200 from the gas storage chamber 204. The actuation of the inflator 200 is thus accomplished in a wireless manner-that is, the inflator is free of wires extending into the gas storage chamber 204 or into other areas of the inflator.

Figure 11:
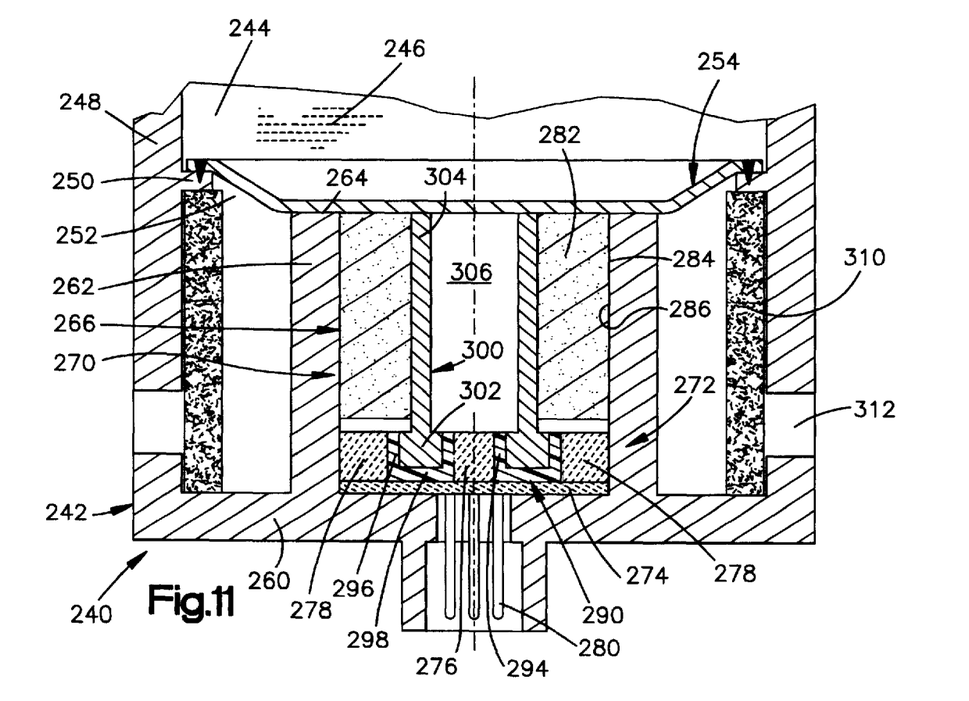
FIG. 11 is a sectional view of an inflator including an initiator in accordance with a fifth embodiment of the present invention.

FIG. 11 illustrates a portion of an inflator 240 constructed in accordance with a fifth embodiment of the present invention. The inflator 240 includes an initiator 270 that uses MEMS devices to (a) open a burst disk and (b) ignite an ignitable material.

The inflator 240 includes a housing 242. The housing 242 defines a gas storage chamber 244. An actuatable inflation fluid source 246 is contained in the chamber 244. For example, the chamber 244 may contain an ignitable mixture of gases that, when ignited, results in inflation fluid under pressure. Alternatively, the chamber 244 may contain an inert gas stored under pressure that, when released from the chamber, inflates an inflatable vehicle occupant protection device, such as an air bag.

The housing 242 has a side wall 248 and a shoulder 250 that defines an opening 252 into the chamber 244. The inflator 240 also includes a burst disk 254 that extends across the opening 252 in the housing 242. The burst disk 254 is welded to the shoulder 250.

The housing has an end wall 260. A cylindrical chamber wall 262 projects axially from the end wall 260 to a location radially inward of the shoulder 250. The chamber wall 262 has an annular end surface 264 presented toward the gas storage chamber 244. The end surface 264 of the chamber wall 262 engages and supports the burst disk 254 against the pressure in the gas storage chamber 244. An ignition chamber 266 is located radially inward of the chamber wall 262, between the end wall 260 and the burst disk 254.

The initiator 270 is located in the ignition chamber 266. The initiator 270 includes a MEMS array 272. The MEMS array 272 includes a base portion 274, a first plurality of electrically energizable MEMS devices 276, and a second plurality of electrically energizable MEMS devices 278.

The base portion 274 of the MEMS array 272 is electrically connected with terminal pins 280 of the initiator 270 and with the first and second pluralities of MEMS devices 276 and 278. The base portion 274 includes circuitry for energizing the first and second pluralities of MEMS devices 276 and 278 in response to a signal received from the terminal pins 280.

The initiator 270 further includes an ignitable material 282. In the illustrated embodiment, the ignitable material 282 is a hollow cylinder of solid pyrotechnic material. The ignitable material 282 has a cylindrical outer surface 284 that is in abutting engagement with a cylindrical inner surface 286 of the chamber wall 262. The ignitable material 282 is located adjacent the burst disk 254 but is spaced from the end wall 260 of the housing 252.

The initiator 270 also includes a substrate or an initiator base 290. The initiator base 290 includes two concentric cylinders 294 and 296 joined at one end by an annular connection portion 298. The first plurality of MEMS devices 276 has a cylindrical configuration and is located at the radial center of the initiator 270, radially inside the first cylinder 294 of the initiator base 290. The second plurality of MEMS devices 278 has an annular configuration and is located radially outward of the second cylinder 296 of the initiator base 290.

The initiator 270 also includes a support member 300. The support member 300 is a cylindrical member located radially inward of the cylinder of ignitable material 282, and extending between the initiator base 290 and the burst disk 254. The support member 300 has a base 302 disposed between the first and second cylinders 294 and 296 of the initiator base 290. An outer end portion 304 of the support member 300 engages and supports the burst disk 254, radially inward of the body of ignitable material 282.

In the center of the support member 300 is an open space 306 that extends between the first plurality of MEMS devices 276 and the burst disk 254. The first plurality of MEMS devices 276 is exposed to the center of the burst disk 254 through this open space 306. The second plurality of MEMS devices 278 is exposed to the body of ignitable material 282.

The terminal pins 280 of the initiator 270 are connected with vehicle electric circuitry (not shown) for receiving an actuating signal for the inflator 240. When the terminal pins 280 receive an actuating signal, the signal is passed to the circuitry in the MEMS base portion 274. The circuitry in the MEMS base portion 274 determines, on the basis of the actuating signal, whether to energize one or both of the first and second pluralities of MEMS devices 276 and 278.

If the inflator 240 is to be actuated to produce a relatively low fluid output, then the first plurality of MEMS devices 276 is energized, but the second plurality of MEMS devices 278 is not energized. The first plurality of MEMS devices 276, when energized, generate combustion products that flow through the open center space 306 of the support member 300 and strike the burst disk 254 to rupture the burst disk. The burst disk 254 opens to enable fluid from the gas storage chamber 244 to flow through a filter 310 located radially outward of the chamber wall and thence through inflation fluid outlets 312 of the inflator 240.

If the inflator 240 is to be actuated to produce a relatively high fluid output, then both the first plurality of MEMS devices 276 and the second plurality of MEMS devices 278 are energized. The first plurality of MEMS devices 276 rupture the burst disk 254 as described above. The second plurality of MEMS devices 278, when energized, generate combustion products that strike and ignite the body of ignitable material 282. The ignitable material 282 generates combustion products, including heat and fluid, that increase the pressure in the gas storage chamber 244. The increased pressure helps the inflator 240 to produce a relatively high fluid output.

Figure 12:
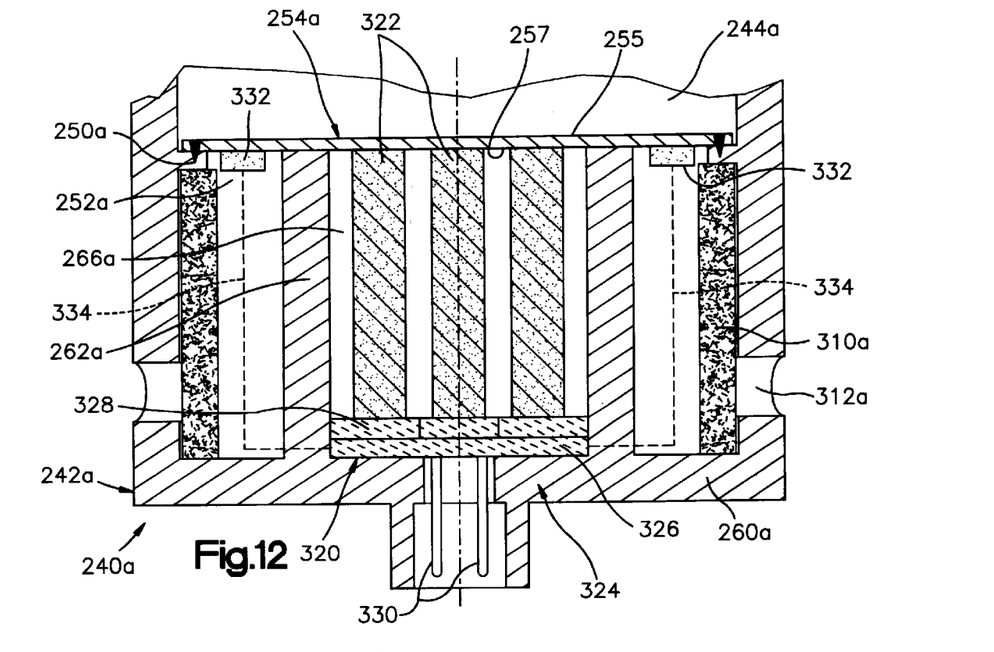
FIG. 12 is a sectional view of an inflator including an initiator in accordance with a sixth embodiment of the present invention.

FIG. 12 illustrates a portion of an inflator 240*a* constructed in accordance with a sixth embodiment of the present invention. The inflator 240*a*, like the inflator 240 (FIG. 11), uses MEMS devices to (a) open a burst disk and (b) ignite an ignitable material. Parts of the inflator 240*a* that are similar to corresponding parts of the inflator 240 are given the same reference numeral with the suffix "a" attached to distinguish them.

The inflator 240*a* (FIG. 12) includes a housing 242*a* and a burst disk 254*a* that extends across an opening 252*a* in the housing. The burst disk 254*a* is welded to a shoulder 250*a*. The burst disk 254*a* has a first major side surface 255 presented toward a gas storage chamber 244*a*, and an opposite second major side surface 257.

The inflator 240*a* includes an initiator 320. A portion of the initiator 320 is located in an ignition chamber 266*a*. Specifically, the initiator 320 includes a plurality of bodies of ignitable material 322 located in the ignition chamber 266*a* and extending between the burst disk 254*a* and an end wall 260*a* of the housing 242*a*.

The initiator 320 also includes a MEMS array 324 located in the ignition chamber 266*a* between the ignitable material 322 and the end wall 260. The MEMS array 324 includes a base portion 326 and plurality of electrically energizable MEMS devices 328. The base portion 326 of the MEMS array 324 is electrically connected with terminal pins 330 of the initiator 320 and includes circuitry for energizing the plurality of MEMS devices 328. The terminal pins 330 are connected with vehicle electric circuitry (not shown) for receiving an actuating signal for the inflator 240*a*.

The initiator 320 also includes an annular MEMS array 332 that is secured to the second major side surface 257 of the burst disk 254*a*, at a location radially outward of the chamber wall 262*a*. The MEMS array 332 is connected by leads shown schematically at 334 with the MEMS base portion 326.

When the terminal pins 330 of the initiator 320 receive an actuating signal for the inflator 240*a*, the signal is passed to the circuitry in the MEMS base portion 326. If the inflator 240*a* is to be actuated to produce a relatively low fluid output, then the MEMS devices of the array 332 are energized, but not the MEMS devices 328 of the MEMS array 324. The MEMS devices of the array 332, when energized, cause the burst disk 254*a* to rupture along its outer periphery. Inflation fluid from the gas storage chamber 244*a* flows through the filter 310*a* and thence through inflation fluid outlets 312*a* of the inflator 240*a*.

If the inflator 240*a* is to be actuated to produce a relatively high fluid output, then both the first MEMS array 324 and the second MEMS array 332 are energized. The MEMS devices in the array 332 rupture the burst disk 254*a* as described above. The MEMS devices 328 of the array 324, when energized, generate combustion products that ignite the ignitable material 322. The ignitable material 322 generates combustion products, including heat and fluid, that increase the pressure in the gas storage chamber 244*a*. The increased pressure helps the inflator 240*a* to produce a relatively high fluid output.

Figure 13:
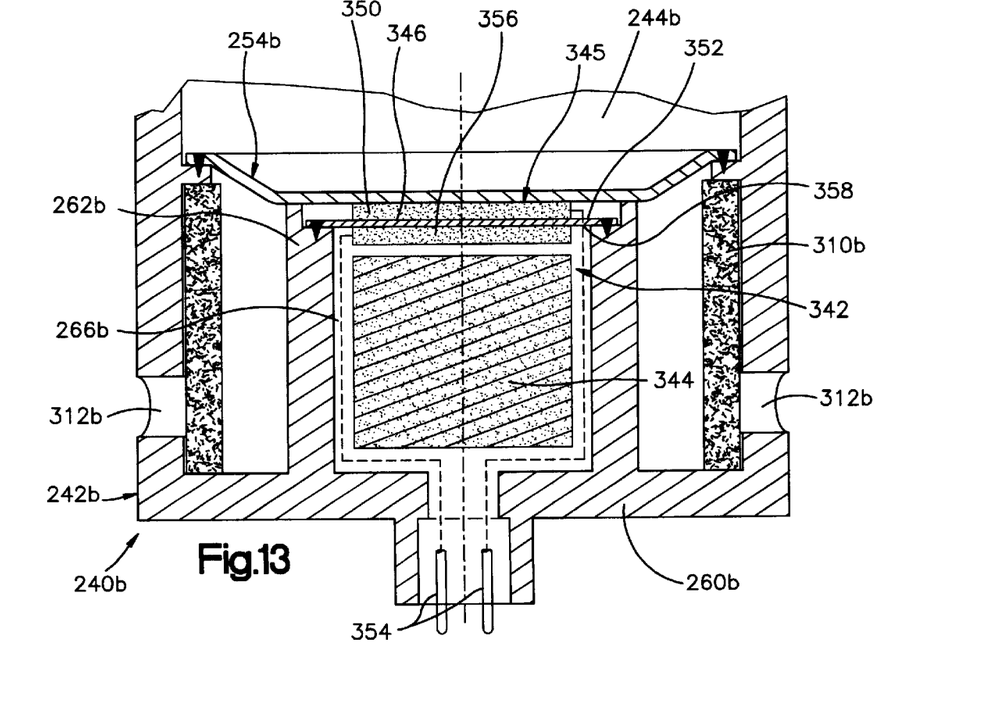
FIG. 13 is a sectional view of an inflator including an initiator in accordance with a seventh embodiment of the present invention.

FIG. 13 illustrates a portion of an inflator 240*b* constructed in accordance with a seventh embodiment of the present invention. The inflator 240*b*, like the inflator 240 (FIG. 11), uses MEMS devices to (a) open a burst disk and (b) ignite an ignitable material. Parts of the inflator 240*b* that are similar to corresponding parts of the inflator 240 are given the same reference numeral with the suffix "b" attached to distinguish them.

The inflator 240*b* includes a housing 242*b* and a burst disk 254*b*. The inflator 240*b* also includes an initiator 342 located in an ignition chamber 266*b*. The initiator 342 includes a body of ignitable material 344 located between the central portion of the burst disk 254*b* and an end wall 260*b*.

The initiator 342 also includes a MEMS assembly 345 located in the ignition chamber 266*b* between the ignitable material 344 and the central portion of the burst disk 254*b*. The MEMS assembly 345 includes a circular substrate or support disk 346 that is welded to the chamber wall 262*b* along the outer periphery of the support disk.

The MEMS assembly 345 also includes a first MEMS array 350 located on one side 352 of the support disk 346, facing the central portion of the burst disk 254*b*. The first MEMS array 350 includes a plurality of electrically energizable MEMS devices. The first MEMS array 350 is electrically connected with terminal pins 354 of the initiator 342 and includes circuitry for energizing the plurality of MEMS devices in the array 350. The terminal pins 354 are connected with vehicle electric circuitry (not shown) for receiving an actuating signal for the inflator 240*b*.

The MEMS assembly 344 also includes a second MEMS array 356 located on the opposite side 358 of the support disk 346, facing the ignitable material 344. The second MEMS array 356 includes a plurality of electrically energizable MEMS devices. The second MEMS array 356 is electrically connected with the terminal pins 354 of the initiator 342 and includes circuitry for energizing the plurality of MEMS devices in the second MEMS array.

When the terminal pins 354 receive an actuating signal for the inflator 240*b*, the signal is passed to the circuitry in the first and second MEMS arrays 350 and 356. The circuitry in the first and second MEMS arrays 350 and 356 determines, on the basis of the actuating signal, whether to energize one or both of the first and second pluralities of MEMS devices.

Specifically, if the inflator 240*b* is to be actuated to produce a relatively low fluid output, then the first MEMS array 350 is energized, but not the second MEMS array 356. The MEMS devices in the first array 350, when energized, cause the burst disk 254*b* to rupture. Inflation fluid from the gas storage chamber 244*b* flows through the filter 310*b* and thence through the inflation fluid outlets 312*b* of the inflator 240*b*.

If the inflator 240*b* is to be actuated to produce a relatively high fluid output, then both the first MEMS array 350 and the second MEMS array 356 are energized. Energizing the first MEMS array 350 ruptures the burst disk 254*b* as described above. Energizing the second MEMS array 356, generates combustion products that ignite the ignitable material 344. The ignitable material 344 generates combustion products, including heat and fluid, that increase the pressure in the gas storage chamber 244*b*. The increased pressure helps the inflator 240*b* to produce a relatively high fluid output.

From the above description of the invention, those skilled in the art will perceive improvements, changes and modifications in the invention. Such improvements, changes and modifications within the skill of the art are intended to be covered by the appended claims.

Having described the invention, we claim:

1. An initiator for actuating an inflation fluid source for an inflatable vehicle occupant protection device, said initiator comprising:

a base;

a cap attached to said base and at least partially defining a plurality of chambers in said initiator, each one of said chambers containing ignitable material for, when ignited, generating combustion products for actuating said inflation fluid source;

a plurality of electrically energizable microelectromechanical system (MEMS) devices supported on said base, said MEMS devices being associated in a one to one relationship with said chambers, each one of said MEMS devices when energized generating combustion products, including heat, for igniting the associated ignitable material; and at least one terminal pin electrically connected with said plurality of MEMS devices for receiving an electric signal for energizing at least one of said MEMS devices.

2. An initiator as set forth in claim 1 wherein said plurality of chambers comprises:

a first chamber containing ignitable material that is ignitable to generate combustion products of a first magnitude; and a second chamber containing ignitable material that is ignitable to generate combustion products of a second magnitude different from said first magnitude.

3. An initiator as set forth in claim 1 further comprising electric circuitry for receiving the electric signal from said at least one terminal pin, said electric circuitry being operative to energize selected ones of said plurality of MEMS devices in response to the electric signal.

4. An initiator as set forth in claim 1 wherein each one of said MEMS devices comprises a heating element and a MEMS chamber containing a material that when heated increases the pressure in the MEMS chamber.

5. An initiator as set forth in claim 1 wherein each one of said plurality of MEMS devices is separately energizable from the other ones of said plurality of MEMS devices.

6. An initiator as set forth in claim 1 wherein said plurality of MEMS devices are formed as an array supported on said base of said initiator.

7. An inflator for an inflatable vehicle occupant protection device, said inflator comprising:

a housing;

a solid body of ignitable material in said housing for, when ignited, generating inflation fluid for inflating the protection device;

a plurality of microelectromechanical system (MEMS) devices in said housing at spaced locations adjacent said body of ignitable material, said MEMS devices being electrically energizable to generate combustion products for fracturing said body of ignitable material at said spaced locations to promote ignition of said body of ignitable material; and at least one terminal pin electrically connected with said plurality of MEMS devices for receiving an electric current for energizing at least one of said MEMS devices.

8. An inflator as set forth in claim 7 wherein each one of said plurality of MEMS devices is separately energizable from the other ones of said plurality of MEMS devices.

9. An inflator as set forth in claim 7 wherein each one of said MEMS devices comprises a heating element and a chamber containing a material that when heated increases the pressure in the chamber.

10. An inflator for an inflatable vehicle occupant protection device, comprising:

a container having an opening;

a burst disk closing said opening in said container;

inflation fluid stored under pressure in said container;

a plurality of individually energizable microelectromechanical system (MEMS) devices supported at predetermined locations adjacent said burst disk; and a controller for energizing selected ones of said plurality of MEMS devices to make an opening of a selected configuration in said burst disk.

11. An inflator as set forth in claim 10 wherein said controller is operative to energize selected ones of said plurality of MEMS devices at different times.

12. An inflator as set forth in claim 11 wherein said controller is operative to energize a first group of selected ones of said plurality of MEMS devices at one time and a second group of selected ones of said plurality of MEMS devices at a second time.

13. An inflator as set forth in claim 10 wherein the vehicle includes a sensor operative to sense a condition of said inflator or of the vehicle or of the vehicle occupant and to output a signal indicative of the sensed condition, said controller being responsive to said signal to control opening of said burst disk.

14. An inflator as set forth in claim 13 wherein said controller is operative to receive input from one or more sensors to determine the configuration of the opening in said burst disk and to energize appropriate ones of said plurality of MEMS devices as a result.

15. An inflator for an inflatable vehicle occupant protection device, comprising:

a container defining a chamber;

an actuatable inflation fluid source in said chamber; and an actuation module in said chamber, said actuation module including:

a plurality of individually energizable microelectromechanical system (MEMS) devices for, when energized, actuating said inflation fluid source, and a receiver for receiving a control signal from outside said chamber for energizing at least one of said MEMS devices to actuate said inflation fluid source;

said inflator being free of wires extending into said chamber.

16. An inflator as set forth in claim 15 wherein said receiver is a radio frequency receiver.

17. An inflator as set forth in claim 15 wherein said actuation module further comprises a power source for providing electric power for energizing said plurality of MEMS devices.

18. An initiator as set forth in claim 15 wherein said actuation module further comprises electric circuitry operative to energize selected ones of said plurality of MEMS devices in response to the received control signal.

19. An inflator for an inflatable vehicle occupant protection device, said inflator comprising:

a container having an opening;

a burst disk closing said opening in said container;

inflation fluid stored under pressure in said container;

a body of ignitable material in said container; and an initiator comprising a first plurality of electrically energizable microelectromechanical system (MEMS) devices for opening said burst disk and a second plurality of electrically energizable devices MEMS devices for igniting said ignitable material;

said first plurality of MEMS devices being energizable independently of said second plurality of MEMS devices.

20. An inflator as set forth in claim 19 wherein said first and second pluralities of MEMS devices are located on the same substrate at locations spaced apart from each other.

21. An inflator as set forth in claim 19 wherein said first and second pluralities of MEMS devices are located on opposite sides of the same substrate.

22. An inflator as set forth in claim 20 wherein said first and second pluralities of MEMS devices are located on separate substrates at locations spaced apart from each other.

23. An inflator as set forth in claim 19 wherein said container contains fluid under pressure and a support member for supporting said burst disk against the pressure of said fluid, said support member extending between said first and second pluralities of MEMS devices to separate the output of said first plurality of MEMS devices from the output of said second plurality of MEMS devices.

24. An initiator for actuating an inflation fluid source for an inflatable vehicle occupant protection device, said initiator comprising:

a base; and a plurality of electrically energizable microelectromechanical system (MEMS) devices supported on said base, each one of said MEMS devices when energized generating combustion products, including heat.

25. An initiator as set forth in claim 24 comprising a cover attached to said base and at least partially defining a chamber in said initiator for receiving combustion products of said MEMS devices;

said initiator having a first condition when a relatively small number of said MEMS devices are energized in which said initiator has a first flow area for allowing outflow of combustion products from said chamber;

said initiator having a second condition when a relatively large number of said MEMS devices are energized in which said initiator has a second flow area greater than said first flow area for allowing outflow of combustion products from said chamber.

26. An initiator as set forth in claim 25 wherein said cover has a first open condition with a first flow area when said initiator is in the first condition, and said cover has a second open condition with a greater flow area due to increased pressure in said chamber when said initiator is in the second condition.

* * * * *